(12) United States Patent
Datta et al.

(10) Patent No.: US 8,283,392 B2
(45) Date of Patent: Oct. 9, 2012

(54) PARTICLE COMPRISING A MATRIX AND A RADICAL INITIATOR

(75) Inventors: Rabindra Nath Datta, Schalkhaar (NL); Sumana Datta, legal representative, Schalkhaar (NL); Sebastianus Christoffel Josephus Pierik, Lent (NL); Johan P. Baaij, Schalkhaar (NL)

(73) Assignee: Teijin Aramid B.V., Arnhem (NL)

( * ) Notice: Subject to any disclaimer, the term of this patent is extended or adjusted under 35 U.S.C. 154(b) by 468 days.

(21) Appl. No.: 12/504,402

(22) Filed: Jul. 16, 2009

(65) Prior Publication Data
US 2010/0076151 A1 Mar. 25, 2010

Related U.S. Application Data

(63) Continuation-in-part of application No. 12/310,621, filed as application No. PCT/EP2007/008496 on Sep. 29, 2007, now abandoned.

(30) Foreign Application Priority Data

Oct. 6, 2006 (EP) .................................... 06021012
Jul. 6, 2007 (EP) .................................... 07013303

(51) Int. Cl.
*C08K 9/00* (2006.01)

(52) U.S. Cl. ......... 523/211; 428/378; 428/393; 428/394

(58) Field of Classification Search .................. 523/211; 428/378, 393, 394
See application file for complete search history.

(56) References Cited

U.S. PATENT DOCUMENTS

| 2,999,788 A | 9/1961 | Morgan |
| 2,999,834 A * | 9/1961 | Wismer et al. ................ 523/206 |
| 3,484,333 A | 12/1969 | Vanderbilt |
| 3,674,542 A | 7/1972 | Vanderbilt et al. |
| 4,377,398 A | 3/1983 | Bennett |
| 4,939,209 A * | 7/1990 | Kitagawa et al. ............. 525/285 |
| 5,238,978 A | 8/1993 | Stein |
| 5,319,003 A | 6/1994 | Gomez et al. |
| 5,571,288 A | 11/1996 | Zakikhani et al. |
| 5,830,395 A | 11/1998 | Vercesi et al. |
| 6,068,922 A | 5/2000 | Vercesi et al. |
| 6,191,286 B1 | 2/2001 | Gunther et al. |
| 2006/0063884 A1 | 3/2006 | Akiyama |
| 2009/0093575 A1 | 4/2009 | Kabashima et al. |

FOREIGN PATENT DOCUMENTS

| DE | 100 59 287 A1 | 7/2002 |
| EP | 0 227 048 | 7/1987 |
| EP | 0 688 898 A1 | 12/1995 |
| EP | 0 889 072 A1 | 1/1999 |
| EP | 1 571 253 A1 | 9/2005 |
| EP | 1 728 821 | 12/2006 |
| JP | A-54-080353 | 6/1979 |
| WO | WO 9522576 A1 * | 8/1995 |
| WO | WO 00/58064 A1 | 10/2000 |
| WO | WO 02/40577 A1 | 5/2002 |
| WO | WO 2007/015371 | 2/2007 |
| WO | WO 2008/040507 | 4/2008 |

OTHER PUBLICATIONS

Hoffman et al., "Chapter 4: Rubber Chemicals and Additives," *Rubber Technology Handbook*, Hauser Publishers, Munich, 1989, pp. 217-353.

* cited by examiner

*Primary Examiner* — Vickey Nerangis
(74) *Attorney, Agent, or Firm* — Oliff & Berridge, PLC

(57) ABSTRACT

The invention pertains to a particle comprising a composition containing a matrix and a peroxide or azo radical initiator, wherein the particle is a fiber or fibrid selected from aramid, polyester, polyimide, cellulose, and glass. The invention further relates to particle-elastomers comprising said composition, and skim products, tires, tire treads, and belts comprising these particle-elastomers.

12 Claims, No Drawings

PARTICLE COMPRISING A MATRIX AND A RADICAL INITIATOR

This is a Continuation-in-Part of application Ser. No. 12/310,621 filed Mar. 2, 2009, which in turn is a National Phase of PCT/EP2007/008496 filed Sep. 29, 2007, which claims the benefit of European Patent Application Nos. 06021012.7 and 07013303.8 filed Oct. 6, 2006 and Jul. 6, 2007, respectively. The disclosure of the prior applications is hereby incorporated by reference herein in its entirety.

The invention pertains to a particle comprising a composition containing a matrix and a peroxide or azo radical initiator. The invention further relates to a particle elastomer composition, and to a skim product, a tire, a tire tread, an undertread, a belt, and a hose comprising said particle-elastomer composition.

In the tire and belt industry, among others, better mechanical, heat build up and hysteresis properties are being demanded. It has long been known that the mechanical properties of rubber can be improved by using a large amount of sulfur as a cross-linking agent to increase the crosslink density in vulcanized rubbers. However, the use of large amounts of sulfur suffers from the disadvantage of high heat generation that leads to a marked decrease in heat resistance and resistance to flex cracking, among other properties, in the final product. In order to eliminate the foregoing disadvantage, it was proposed to add treated chopped fiber, pellets made thereof or treated pellets, particularly treated with polysulfides, Bunte salt, and sulfur to sulfur-vulcanization systems. These pellets further contain wax to improve processing. Although there were improvements in e.g. hysteresis and flex cracking, these improvements were not found when uncured compounds were aged before vulcanization. This is a drawback in applications where uncured compounds are kept for a certain number of days. The present invention has among others to its object to provide particles that maintain their advantageous properties when used in uncured compounds.

Waxed pellets as such are known in the art. For instance, in EP 0 889 072 the coating of aramid pellets with a polymeric component, e.g. a wax, was disclosed. However, these pellets do not comprise a peroxide- or an azo-containing wax.

In U.S. Pat. No. 6,068,922 pellets comprising aramid fibers and an extrudable polymer, e.g. polyethylene, polypropylene or polyamides are disclosed. The fibers may be coated by typical sizing agents (RF, epoxy, silicone). Coatings containing radical initiators are not disclosed.

The present invention provides a solution to the above problems which are associated with aging of unvulcanized compounds. Moreover, the particles of the invention provide further improvements of dynamic properties by using a novel class of treated particles, including chopped fibers, staple fiber, and pulp, in the sulfur and peroxide vulcanization of rubbers and provides in a particle that solves a long-standing problem of reducing hysteresis and heat generation in rubber compositions.

To this end the invention relates to a particle comprising a composition containing a matrix and a peroxide or azo radical initiator wherein the particle is a fiber or fibrid selected from aramid, polyester, polyamide, cellulose, and glass.

The peroxide can be any peroxide and contains at least one peroxide group. Peroxides can be either mono- or bisperoxides. Peroxides can be technically pure or mixed with an inorganic support such as clay or silica, a polymeric support such as EPDM or combinations of these supports. Furthermore, peroxides can be diluted with a solvent or an oil such as a paraffin oil. Furthermore, peroxides can be dispersed in silicone oil.

Examples of suitable peroxides include cyclic peroxide, diacyl peroxide, dialkyl peroxide, hydroperoxide, peroxycarbonate, peroxydicarbonate, peroxyester, ketone peroxide, derivatives of ketone peroxide, inorganic peroxide, peroxyketal, mixed peroxide and mixtures of any two or more of these peroxides. More preferably, the peroxide is selected from dialkyl peroxyketal, dialkyl peroxide, di(alkylperoxy)alkylene, di(alkylperoxy)aralkylene, alkyl acyl peroxide, alkyl hydro-peroxide, or a mixture thereof, such as dicumyl peroxide, di(tert-butyl)peroxide, di(tert-butylperoxyisopropyl)benzene, t-butyl peroxy-3,5,5-trimethylhexanoate, 2,5-dimethyl-2,5-di(t-butylperoxy)hexane, cumyl hydroperoxide, 1,1-(tert-butyl-peroxy)cyclohexane and 1,1-(tert-butylperoxy)-3,3,5-trimethylcyclohexane. Most preferably, the peroxide is 1,1-(tert-butylperoxy)cyclohexane or 1,1-(tert-butyl-peroxy)-3,3,5-trimethylcyclohexane.

Azo radical initiators have the general formula R—N=N—R', which compounds can be a precursor of two carbon-centered radicals R■ and R'■ and nitrogen gas upon heating or irradiation. Azo radical initiators include compounds such as 2,2'-azobis(2-methylpropanenitrile), 1,1'-azobis(1-cyclohexanenitrile), 2,2'-azobis(2-methylbutanenitrile), 4,4'-azobis(4-cyanovaleric acid), 2,2'-azobis(methyl 2-methylpropanate), and 2,2'-azobis(2-phenylpropane).

In a preferred embodiment the invention relates to a particle comprising a matrix and a radical initiator, which enhances the rubber properties of an elastomer. The matrix may be a wax, an extrudable polymer, an inorganic filler, an oil, an organic solvent or a combination of two or more of these. The preferred composition contains up to 85 wt % of matrix, preferably wax and/or extrudable polymer, based on the weight of the composition. Examples of suitable waxes are microcrystalline wax of higher alkyl chains, such as a C22-C38 alkyl chain, paraffin wax or alkyl long chain fatty acid ester waxes, such as C12-C50 alkanecarboxylic acids esters. Instead of a wax, the matrix can also be selected from an extrudable polymer. Particularly useful are polyolefins, e.g. polyethylene, polypropylene or derivatives thereof, as well as mixtures thereof. The term "derivative" means that the polyolefin may be obtained from a certain olefin and minor amounts of other olefins, or that the polyolefin is a grafted polyolefin. For example, instead of pure polyethylene also modified polyethylene such as Plexar® can be used. Polyolefins include high and low density polymers and copolymers. Polyamides can also be used. The extrudable polymer can also be used as a mixture with a wax. The matrix can contain one or more inorganic fillers, such as silica, whiting and clay. The matrix can contain oil, such as paraffin or naphthene oils. Optionally, the matrix can contain a solvent, such as a saturated alkane.

The peroxide initiator and/or the azo initiator as present in the composition do not have any measurable effect on the vulcanization of the rubber. The content of this initiator in the composition is far too low to effectively vulcanize rubber. Thus independently from the radical initiator in the composition of this invention it is necessary to use peroxide or sulfur to vulcanize the rubber. The radical initiator in the particle comprising the composition thus is believed to have only a substantial and advantageous effect on the adhesion of the particles to the rubber. It is further believed that this improved adhesion is responsible for the improved properties, such as modulus, hardness, abrasion resistance, hysteresis, Payne effect, and heat build-up of rubbers thus treated.

The term "particle" as used herein relates to any shape of a particle, including a pellet as obtained by compressing individual particles by conventional means. The particles may be provided with the composition, and pellets can be made thereof, for instance by cutting the particle contained in the matrix-radical initiator composition to pellets, or alternatively, first shaping the particles without composition into a pellet followed by treatment thereof with the composition. The pellet may be composed of any particle according to the invention. Particles are selected from aramid, polyester, polyamide, cellulose, and glass. The particles are in the form of fiber or fibrid. Fibers include continuous fiber, chopped fiber, staple fiber, pulp or fibril. Fibrids are small, non-granular, non-rigid fibrous or film-like particles, wherein in films one of their dimensions is in the order of microns, and in fibers two dimensions are in the micron range. The term "fibrid" is well known in the art and clear to those skilled in the art. The skilled reader is further referred to U.S. Pat. No. 2,999,788 wherein a precise definition is given in which the term "fibrids" is further defined in that a fibrid particle must possess an ability to form a waterleaf. Aramid fibers (which include continuous fiber, chopped fiber, staple fiber, and pulp, which may be pre-treated with a sizing) have the preference, more specifically particles of poly(p-phenylene-terephthalamide) or co-poly-(paraphenylene/3,4'-oxydiphenylene terephthalamide. Most preferred are chopped fiber and staple fiber.

The term "pellet" includes terms, apart from pellet, that are synonymous or closely related such as tablet, briquette, pastilles, granule and the like.

Pellets can be made from short cut fibers, chopped fiber, staple fiber, pulp, fibrils, and fibrid by mixing these particles with the radical initiator and a matrix, such as a matrix of a wax, an extrudable polymer, an inorganic filler, an oil, a solvent and/or any suitable combination of these.

For instance, the pellet can be prepared according to the method described in WO 0058064. Alternatively, pellets can be prepared directly using chopped fiber and the like, wax, and the radical initiator. The particles, the matrix, and the radical initiator are mixed intensively and optionally heated up to a temperature at or above the melting point of the wax or extruded polymer. Then the mixture is formed into the shape of a pellet at a temperature below the melting point of the wax or extruded polymer. Wax (and/or extrudable polymer) can be used in amounts up to 85 wt % based upon the weight of the particle together with the composition. Alternatively, pellets can also be made from a mixture of particle and matrix, after which the radical initiator is added.

A particularly preferred embodiment of the invention is particles provided with the composition in the form of a coating. Such particles, most preferably shaped into a pellet, are then at least partially coated with the composition or particles already provided with a matrix are at least partially coated with the radical initiator. Coating of the particles, for instance, can be carried out using a solution of radical initiator in a suitable solvent, e.g. toluene or using a dispersion of said radical initiator in e.g. toluene/water.

The meaning of the term "coating" is well known for the skilled man and can be found in any relevant textbook. Thus a coated particle is a particle containing a layer of the coating material (the coating) around its surface. If the particle is partially coated, only part of the particle is covered by said layer. In principle there is no difference whether the particles are coated and made to a pellet, or when the particles are made to a pellet and then coated. The coating composition will completely penetrate the pellet and coat the individual particles therein. It is also possible that the coating material or part of the coating material penetrates between fibers of the particle, or even between filaments and microfilaments, thereby impregnating the particle.

The treatment of the particle thereof is based on the above radical initiator, preferably selected from 1,1-(tent-butylperoxy)cyclohexane and 1,1-(tert-butyl-peroxy)-3,3,5-trimethylcyclohexane.

The treatment of the particle (or the particle being shaped into a pellet) is based on the above matrix such as paraffin wax, and peroxide and/or azo radical initiator. It should be stressed that the at least partial coating of the particle can be done on the particle as such, or on the particle after pelletization of the particle.

Particles of the invention can also contain a wax as a carrier medium to improve processing. Examples of suitable waxes are microcrystalline wax of higher alkyl chains, such as C22-C38 alkyl chains, paraffin wax, or alkyl long chain fatty acid ester waxes, such as C12-C50 alkanecarboxylic acids esters. After treatment the particle may be used as such or may be comminuted to appropriate size, to be suitably used in rubber compounds, After treatment fibers may be chopped to appropriate length, for use in rubber compounds, or chopped fiber may be treated by the above chemicals, or chopped fibers and the above chemicals including a wax may be mixed, optionally heated and formed into a well dosable shape.

The radical initiator amounts 0.5 to 50 wt %, preferably 1 to 30 wt %, more preferably 2 to 20 wt %, based on the weight of the particle. Throughout this description the expression "based on the weight of the particle" means based on the total weight of the particle provided with the composition.

Pellets prepared according to the method described in WO 0058064 can be treated either using a solution of radical initiator in a suitable solvent e.g. toluene or a dispersion of said radical initiator in e.g. toluene/water or using a mixture of said radical initiator in a suitable matrix such as stearyl or palmityl stearate. The matrix preferably comprises up to 85 wt % of the particle, more preferably between 20 and 67 wt %.

Pellets can be prepared directly using chopped fiber, wax, and radical initiator as described above. Preferably, the wax is stearyl stearate or palmityl stearate.

Preferred compositions comprise 5-98 wt % radical initiator based on the weight of the composition. The expression "the weight of the composition" as used in this description means the weight of the composition only, i.e. without the particle.

In another aspect the invention relates to an uncured rubber composition obtained by mixing the elastomer, the particle of the invention, the filler and optionally other rubber additives in absence of the vulcanization agents.

The mixing process is carried out with the elastomer in the presence of 0.1 to 20 phr, more preferable of 0.5-10 phr of the particle according to the invention at a temperature in the range from 110 to 220° C. for a period of up to 2 hours. Preferably, the mixing temperature is chosen to obtain good incorporation of the particle of the invention and thereby obtaining significant reduction of the Payne effect and hysteresis within 5 minutes of mixing. Preferably, the particle of the invention is added together with the filler. The mixing process can be carried out in any mixer in which the uncured rubber composition can be mixed and can be heated to the required temperature. Preferably, the mixing is carried out in an internal mixer such as a Banbury mixer.

The expression "uncured elastomeric product" is defined as that less than 10 wt %, preferably less than 5 wt %, and even more preferably less than 1 wt % of the elastomer is cured. Most preferred the amount of the particle of the invention is low enough to prevent any curing of the elastomer product.

In another aspect the invention relates to a rubber composition which is the vulcanization reaction product of the above uncured rubber composition comprising the particle according to the invention, and a vulcanization agent. The particle of the invention lowers hysteresis and the Payne effect and reduces the heat build-up of the rubber composition. Also disclosed is a vulcanization process carried out in the presence of the uncured elastomer product comprising the particle of the invention and the use of these particles in the vulcanization of rubbers. The vulcanization agent can be either a peroxide or sulfur. The sulfur may be replaced by a sulfur donor.

In addition, the present invention relates to a vulcanization process carried out in the presence of the particles and the use of these particles in the vulcanization of rubbers. Further, the invention also encompasses rubber products which comprise at least some rubber which has been vulcanized, preferably vulcanized with sulfur or peroxide, in the presence of said particles.

The present invention provides rubber having excellent hysteresis behavior and heat build-up without having a significant adverse effect on the remaining properties, when compared with similar sulfur- or peroxide-vulcanization systems without any of the particles. Furthermore, rubber compound properties are independent of the time between mixing and vulcanization over a period of at least 28 days.

To this end, the invention also relates to an elastomer composition comprising
(a) 100 parts by weight of at least one natural or synthetic rubber;
(b1) 0.1 to 25 parts by weight of an amount of sulfur and/or a sulfur donor; or
(b2) 0.1 to 20 parts by weight of peroxide; and
(c) 0.1 to 20 parts by weight of the hereinabove described particle.

Preferred amounts of sulfur, respectively sulfur donor are 1 to 20 parts by weight, more preferably 1 to 15 parts.

Preferred amounts of peroxide are 1 to 20 parts by weight, more preferably 1 to 15 parts.

Preferred amounts of the above particle are in the range 1 to 20 parts by weight The present invention is applicable to all natural and synthetic rubbers. Examples of such rubbers include, but are not limited to, natural rubber, styrene-butadiene rubber, butadiene rubber, isoprene rubber, acrylonitrile-butadiene rubber, chloroprene rubber, isoprene-isobutylene rubber, brominated isoprene-isobutylene rubber, chlorinated isoprene-isobutylene rubber, ethylene-propylene-diene ter-polymers, as well as combinations of two or more of these rubbers and combinations of one or more of these rubbers with other rubbers and/or thermoplastic compounds.

When sulfur vulcanization is applied the required level of sulfur during the vulcanization process is provided by sulfur, optionally together with sulfur donors, or sulfur donors only. Examples of sulfur which may be used in the vulcanization process include various types of sulfur such as powdered sulfur, precipitated sulfur, and insoluble sulfur. Examples of sulfur donors include, but are not limited to, tetramethylthiuram disulfide, tetraethylthiuram disulfide, tetrabutylthiuram disulfide, dipentamethylene thiuram hexasulfide, dipentamethylene thiuram tetrasulfide, dithiodimorpholine, and mixtures thereof.

Sulfur donors may be used instead or in addition to the sulfur. Herein the term "sulfur" shall further also include sulfur donors and the mixture of sulfur and sulfur donor(s). Further, the quantity of sulfur employed in the vulcanization process when applied to sulfur donors, means the quantity of sulfur that is rendered by the sulfur donor.

More particularly, the present invention relates to a sulfur-vulcanized rubber composition which comprises the vulcanization reaction product of: (a) 100 parts by weight of at least one natural or synthetic rubber; (b) 0.1 to 25 parts by weight of an amount of sulfur and/or an amount of sulfur donor providing 0.1 to 25 parts by weight of sulfur; and (c) 0.1 to 20 parts by weight of the particle of the invention, preferably wherein the particle is chopped fiber, staple fiber, or pellets made thereof.

The particle of the present invention is based on natural and synthetic polymers. Examples of such polymers include aramid, such as para-aramid, polyimide, polyester, cellulose, such as rayon, and glass as well as combinations of two or more of these yarns.

Most preferably the particle is poly(para-phenylene-terephthalamide) fiber, which is commercially available under the trade name Twaron®, or co-poly-(para-phenylene/ 3,4'-oxydiphenylene terephthalamide), which is commercially available under the trade name Technora®.

The amount of sulfur to be compounded with the rubber is, based on 100 parts of rubber, usually 0.1 to 25 parts by weight, and more preferably 0.2 to 8 parts by weight. The amount of particle to be compounded with the rubber is, based on 100 parts of rubber, 0.1 to 25 parts by weight, and more preferably 0.2 to 10.0 parts by weight, and most preferably 0.5 to 5 parts by weight. The vulcanization agent and the particle of the invention may be added as a pre-mix, or simultaneously or separately to the rubber, and they may be added separately or together with other rubber compounding ingredients as well. Usually it is also desirable to have a vulcanization accelerator in the rubber compound. Conventional known vulcanization accelerators may be employed. Preferred vulcanization accelerators include mercapto benzothiazole, 2,2'-mercapto benzothiazole disulfide, sulfenamide accelerators including N-cyclohexyl-2-benzothiazole sulfenamide, N-tert-butyl-2-benzothiazole sulfenamide, dicyclohexyl-2-benzothiazole sulfenamide, and 2-(morpholinothio)benzothiazole; thiophosphoric acid derivative accelerators, thiurams, dithiocarbamates, diphenyl guanidine, diorthotolyl guanidine, dithiocarbamylsulfenamides, xanthates, triazine accelerators and mixtures thereof.

If the vulcanization accelerator is employed, quantities of from 0.1 to 8 parts by weight, based on 100 parts by weight of rubber composition, are used. More preferably, the vulcanization accelerator comprises 0.3 to 4.0 parts by weight, based on 100 parts by weight of rubber.

The vulcanization process can also be performed by non-sulfur containing compounds, such as peroxides or a combination of metal oxide and ethylene thiourea. Preferably, the non-sulfur vulcanization process is performed by peroxides. Examples of peroxides which may be used in the vulcanization process include various types of dialkyl, alkyl-aralkyl, diaralkyl, alkyl-ketal and diaroyl peroxide and mixtures thereof. Peroxides can be either mono- or bisperoxides. Examples of such peroxides include dicumyl peroxide, di(tert-butyl)peroxide, tert-butylcumylperoxide, 2,5-dimethyl-2,5-di(tert-butylperoxy)-hexane, 2,5-dimethyl-2,5-di (tert-butylperoxy)hexyne-3, butyl 4,4-di(tert-butyl-peroxy) valerate and di(tert-butylperoxyisopropyl)benzene. Peroxides can be technically pure or mixed with an inorganic support such as clay or silica, a polymeric support such as EPDM or combinations of these supports. Peroxides can be dispersed in silicone oil.

Furthermore, the vulcanization process can be carried out in the presence of a polymerizable multifunctional monomer.

The amount of peroxide to be compounded with the rubber is, based on 100 parts of rubber, usually 1 to 20 parts by weight, and more preferably 2 to 12 parts by weight. The amount of the particle of the invention, preferably peroxide treated aramid particle or pellet, to be compounded with the rubber is, based on 100 parts of rubber, 0.1 to 20 parts by weight, and more preferably 0.5 to 15 parts by weight, and most preferably 1 to 10 parts by weight. These ingredients may be employed as a pre-mix, or added simultaneously or separately, and they may be added separately or together with other rubber compounding ingredients as well.

Other conventional rubber additives may also be employed in their usual amounts in both sulfur vulcanization and peroxide vulcanization. For example, reinforcing agent such as carbon black, silica, clay, whiting, and other mineral fillers, as well as mixtures of fillers, may be included in the rubber composition. Other additives such as process oils, tackifiers, waxes, antioxidants, antiozonants, pigments, resins, plasticizers, process aids, factice, compounding agents and activators such as stearic acid and zinc oxide may be included in conventional, known amounts. Rubber additives which may be used are well known to the skilled man and an extensive listing thereof can be found in textbooks such as W. Hofmann, "Rubber Technology Handbook, Chapter 4, Rubber Chemicals and Additives, pp. 217-353, Hanser Publishers, Munich 1989.

Further, scorch retarders such as phthalic anhydride, pyromellitic anhydride, benzene hexacarboxylic trianhydride, 4-methylphthalic anhydride, trimellitic anhydride, 4-chlorophthalic anhydride, N-cyclohexyl-thiophthalimide, salicylic acid, benzoic acid, maleic anhydride and N-nitrosodiphenylamine may also be included in the rubber composition in conventional, known amounts. Finally, in specific applications it may also be desirable to include steel-cord adhesion promoters such as cobalt salts and dithiosulfates in conventional quantities.

The process is carried out at a temperature of 110-220° C. over a period of up to 24 hours. More preferably, the process is carried out at a temperature of 120-190° C. over a period of up to 8 hours in the presence of 0.1 to 20 parts by weight, more preferable is the use of 0.2-5 parts by weight, of the particles of the invention, more specifically, comprising chopped fiber, staple fiber, or pellets made thereof. The additives to the rubber composition as mentioned above, may also be present during the vulcanization process.

In a more preferred embodiment the vulcanization process is carried out at a temperature of 120-190° C. for 8 hours or less in the presence of 0.1 to 8 parts by weight, based on 100 parts by weight of rubber, of at least one vulcanization accelerator.

The invention also includes articles of manufacture, such as skim products, tires, tire treads, tire undertreads, belts, or hoses which comprise sulfur- or peroxide-vulcanized rubber which is vulcanized in the presence of the particle of the present invention.

The invention is further illustrated by the following examples which are not to be construed as limiting the invention in any way.

EXPERIMENTAL METHODS

In the following examples, rubber compounding, vulcanization and testing was carried out according to standard methods except as otherwise stated: Base compounds were mixed in a Farrel Bridge™ BR 1.6 liter Banbury type internal mixer (preheating at 50° C., rotor speed 77 rpm, mixing time 6 min with full cooling).

Vulcanization ingredients were added to the compounds on a Schwabenthan Polymix™ 150L two-roll mill (friction 1:1.22, temperature 70° C., 3 min).

Cure characteristics were determined using a Monsanto™ rheometer MDR 2000E (arc 0.5°) according to ISO 6502/1999. Delta S is defined as extent of crosslinking and is derived from subtraction of lowest torque (ML) from highest torque (MH).

Sheets and test specimens were vulcanized by compression molding in a Fontyne™ TP-400 press.

Tensile measurements were carried out using a Zwick™ 1445 tensile tester (ISO-2 dumbbells, tensile properties according to ASTM D 412-87, tear strength according to ASTM D 624-86).

Abrasion was determined using a Zwick abrasion tester as volume loss per 40 m path traveled (DIN 53516).

Hardness (IRHD) is measured according to ISO 48:1994.

Heat build-up and compression set after dynamic loading were determined using a Goodrich™ Flexometer (load 1 MPa, stroke 0.445 cm, frequency 30 Hz, start temperature 100° C., running time 120 min or till blow out; ASTM D 623-78). Dynamic mechanical analyses, for example loss modulus and tangent delta were carried out using an Eplexor™ Dynamic Mechanical Analyzer (pre-strain 2%, frequency 10 Hz, ASTM D 2231).

The Payne effect is a particular feature of the stress-strain behavior of rubber, especially rubber compounds containing fillers such as carbon black. The measurement is carried out under cyclic loading conditions, and is manifest as a dependence of the visco-elastic storage modulus on the amplitude of the applied strain.

Example 1

Aramid staple pellets were prepared according to WO 0058064 and contained 80 wt % Twaron and 20 wt % polyethylene resin. The treatment of these pellets was done in the following way:

Trigonox® 29-C75 and Trigonox® 29-40B are commercially available from Akzo Nobel Polymer Chemicals. Trigonox® 29 is 1,1-bis(t-butylperoxy)-3,5,5-trimethyl-cyclohexane. Trigonox® 29-075 is a 75 wt % solution of 1,1-bis(t-butylperoxy)-3,5,5-trimethylcyclohexane in a mineral solvent and Trigonox® 29-40B is a mixture of 1,1-bis(t-butylperoxy)-3,5,5-trimethylcyclohexane with silica and whiting.

About 50 g of para-aramid pellets were mixed with molten wax containing Trigonox® 29-C75 or 40B in various concentrations and optionally clay. When Trigonox® 29-C75 was applied, part of the mineral solvent present in Trigonox® 29-C75 was allowed to evaporate. Subsequently, pellets were cooled using dry-ice and a small excess of solidified wax, possibly containing small amounts of Trigonox® 29, was removed by sieving. As a comparison one sample without any Trigonox® 29 was prepared. The p-aramid fiber pellets are summarized in Table 1.

TABLE 1

Aramid fiber and treatments.

| Particle:polymer:wax:Trigonox29:additive | wt %:wt %:wt %:wt %:wt % | Remark | Entry |
|---|---|---|---|
| Twaron:PE:stearic acid:—:Sunolite | 37.9:9.5:42.0:—:10.6 | comparison | T1 |
| Twaron:PE:Sunolite:C75:solvent | 37.6:9.4:36.8:14.8:1.4 | invention | T2 |
| Twaron:PE:Sunolite:C75:solvent | 37.8:9.4:39.7:10.7:2.4 | invention | T3 |
| Twaron:PE:Sunolite:C75:solvent | 38.2:9.6:43.5:7.1:1.6 | invention | T4 |
| Twaron:PE:Sunolite:C75:solvent | 38.3:9.6:47.8:3.6:0.7 | invention | T5 |
| Twaron:PE:Sas. 5998:C75:solvent | 37.6:9.4:44.2:7.2:16 | invention | T6 |
| Twaron:PE:Sas. 5998:C75:clay:solvent | 36.4:9.1:33.1:7.4:12.5:1.5 | invention | T7 |
| Twaron:PE:St. st.:C75:solvent | 38.4:9.6:43.5:7.1:1.4 | invention | T8 |
| Twaron:PE:Sunolite:40B:silica/whiting | 33.0:8.2:24.7:13.7:20.6 | invention | T9 |
| Twaron:PE:Sunolite:40B:silica/whiting | 36.2:9.0:36.5:7.3:11.0 | invention | T10 |

PE = polyethylene; Sunolite = Sunolite 240, a microcrystalline wax; solvent = mineral spirit present in Trigonox® 29-C75; Sas. 5998 = Sasolwax 5998, which is a paraffin wax; clay = Polestar 200 clay; St. st. = stearyl stearate (Radia® 7501 from Oleon NV); silica/whiting = mixture of silica and whiting present in Trigonox 29-40B.

The accelerator employed was N-cyclohexyl-2-benzothiazole sulfenamide (CBS). Details of the formulations are given in Table 2.

TABLE 2

Rubber formulations incorporating aramid fiber particles

| Ingredients | Experiment | | | | | | | | | | | |
|---|---|---|---|---|---|---|---|---|---|---|---|---|
| | A | B | 1 | 2 | 3 | 4 | 5 | 6 | 7 | 8 | 9 | 10 |
| NR SVR 10 | 80 | 80 | 80 | 80 | 80 | 80 | 80 | 80 | 80 | 80 | 80 | 80 |
| Europrene BR 40 | 20 | 20 | 20 | 20 | 20 | 20 | 20 | 20 | 20 | 20 | 20 | 20 |
| Black N-326 | 53 | 53 | 53 | 53 | 53 | 53 | 53 | 53 | 53 | 53 | 53 | 53 |
| Zinc oxide | 5 | 5 | 5 | 5 | 5 | 5 | 5 | 5 | 5 | 5 | 5 | 5 |
| Stearic acid | 2 | 2 | 0.72 | 2 | 2 | 2 | 2 | 2 | 2 | 2 | 2 | 2 |
| Aromatic oil | 8 | 8 | 8 | 8 | 8 | 8 | 8 | 8 | 8 | 8 | 8 | 8 |
| Antidegradant 6PPD | 2 | 2 | 2 | 2 | 2 | 2 | 2 | 2 | 2 | 2 | 2 | 2 |
| Antioxidant TMQ | 1 | 1 | 1 | 1 | 1 | 1 | 1 | 1 | 1 | 1 | 1 | 1 |
| Accelerator CBS | 1.5 | 1.5 | 1.5 | 1.5 | 1.5 | 1.5 | 1.5 | 1.5 | 1.5 | 1.5 | 1.5 | 1.5 |
| sulfur | 1.5 | 1.5 | 1.5 | 1.5 | 1.5 | 1.5 | 1.5 | 1.5 | 1.5 | 1.5 | 1.5 | 1.5 |
| Trigonox® 29-40B | 0.5 | 0 | 0 | 0 | 0 | 0 | 0 | 0 | 0 | 0 | 0 | 0 |
| T1 | 0 | 0 | 3 | 0 | 0 | 0 | 0 | 0 | 0 | 0 | 0 | 0 |
| T2 | 0 | 0 | 0 | 3 | 0 | 0 | 0 | 0 | 0 | 0 | 0 | 0 |
| T3 | 0 | 0 | 0 | 0 | 3 | 0 | 0 | 0 | 0 | 0 | 0 | 0 |
| T4 | 0 | 0 | 0 | 0 | 0 | 3 | 0 | 0 | 0 | 0 | 0 | 0 |
| T5 | 0 | 0 | 0 | 0 | 0 | 0 | 3 | 0 | 0 | 0 | 0 | 0 |
| T6 | 0 | 0 | 0 | 0 | 0 | 0 | 0 | 3 | 0 | 0 | 0 | 0 |
| T7 | 0 | 0 | 0 | 0 | 0 | 0 | 0 | 0 | 3 | 0 | 0 | 0 |
| T8 | 0 | 0 | 0 | 0 | 0 | 0 | 0 | 0 | 0 | 3 | 0 | 0 |
| T9 | 0 | 0 | 0 | 0 | 0 | 0 | 0 | 0 | 0 | 0 | 3 | 0 |
| T10 | 0 | 0 | 0 | 0 | 0 | 0 | 0 | 0 | 0 | 0 | 0 | 3 |

NR is natural rubber; BR is polybutadiene; 6PPD is N-1,3-dimethylbutyl-N'-phenyl-p-phenylenediamine, TMQ is polymerized 2,2,4-trimethyl-1,2-dihydoquinoline antioxidant, CBS is N-cyclohexyl benzothiazyl sulfenamide.

The vulcanized rubbers listed in Table 2 were tested according to ASTM/ISO norms as described under Experimental methods. A is a control experiment with addition of Trigonox® 29-40B and B is a control experiments (rubber only), 1 is a comparative experiment with aramid particles without radical initiator and 2 to 10 are experiments according to the invention. The results are given in Tables 3-6.

TABLE 3

Effect of the mixes at 100° C. on processing characteristics (Mooney viscosity).

| | Experiment | | | | | | | | | | | |
|---|---|---|---|---|---|---|---|---|---|---|---|---|
| | A | B | 1 | 2 | 3 | 4 | 5 | 6 | 7 | 8 | 9 | 10 |
| ML(1 + 4), MU | 39.9 | 40.2 | 41.8 | 40.5 | 41.4 | 39.7 | 38.9 | 40.6 | 39.7 | 38.9 | 40 | 41.1 |

The data of Table 3 show that the staple fiber particles according to the invention (mix 2 to 10) show low viscosity as evidenced from the ML (1+4) values.

TABLE 4

Effect of the mixes at 150° C. on delta torque.

| | Experiment | | | | | | | | | | | |
|---|---|---|---|---|---|---|---|---|---|---|---|---|
| | A | B | 1 | 2 | 3 | 4 | 5 | 6 | 7 | 8 | 9 | 10 |
| Delta S, Nm | 1.40 | 1.42 | 1.50 | 1.37 | 1.40 | 1.43 | 1.47 | 1.43 | 1.45 | 1.43 | 1.42 | 1.44 |

The data in Table 4 show that the particles according to the invention (2 to 10) do not influence the extent of crosslinking as demonstrated by delta S values.

TABLE 5

Evaluation of staple fibers particles in Payne effect

| | Experiment | | | | | | | | | | | |
|---|---|---|---|---|---|---|---|---|---|---|---|---|
| | A | B | 1 | 2 | 3 | 4 | 5 | 6 | 7 | 8 | 9 | 10 |
| $\Delta(G'_{0.7}-G'_{20})$ (kPa) | 165 | 158 | 188 | 82 | 91 | 106 | 153 | 93 | 106 | 102 | 94 | 102 |
| $\Delta(G'_{0.7}-G'_{90})$ (kPa) | 206 | 200 | 233 | 132 | 138 | 152 | 197 | 140 | 151 | 147 | 140 | 148 | it is clear from the data depicted in Table 5 that the particles of the invention have a lower Payne effect.

TABLE 6

Evaluation of improvement in dynamic mechanical properties

| | Experiment | | | | | | | | | | | |
|---|---|---|---|---|---|---|---|---|---|---|---|---|
| | A | B | 1 | 2 | 3 | 4 | 5 | 6 | 7 | 8 | 9 | 10 |
| Temperature rise, ° C. | 14.9 | 14.9 | 15.4 | 13.1 | 12.8 | 14.2 | 15.1 | 12.7 | 13.3 | 13.9 | 13.4 | 13.5 |
| Loss modulus, MPa | 0.88 | 0.97 | 1.07 | 0.645 | 0.645 | 0.79 | 0.88 | 0.75 | 0.78 | 0.78 | 0.68 | 0.79 |
| Tangent delta | 0.165 | 0.175 | 0.176 | 0.123 | 0.122 | 0.142 | 0.154 | 0.135 | 0.140 | 0.141 | 0.125 | 0.140 |

It is noted that the particles containing peroxide (mix 2 to 10) show improved dynamic mechanical properties. The improvement is realized independently of wax type (mixes 4, 6, and 8), presence of clay (mix 6 and 7) and peroxide formulation (mix 2 and 9). Higher peroxide concentrations in the aramid fiber particle give larger improvements in tangent delta (mix 2 to 5, and mix 9 and 10).

Example 2

Aramid staple fiber pellets were prepared according to WO 0058064 and contained 80 wt % Twaron and 20 wt % polyethylene resin. The treatment of the pellets was done in the following way:

Radia® 7501 (stearyl stearate) is commercially available from Oleon NV. To an 80 L Nauta mixer, 9.0 kg of stearyl stearate were added and molten and heated to about 70° C. Next, 9.0 kg of Trigonox® 29-40B were added in portions. Mixing was continued until a homogeneous mass was obtained. Then 12 kg of aramid staple fiber pellets were added and mixing was continued for about 30 min. Then the heating was switched off and the product was cooled by the addition of 10.7 kg of dry-ice pellets. Finally, the Nauta mixer was emptied. The product (T11 in Table 7) was tested as such. The particle Twaron polyethylene:stearyl stearate:Trigonox 29-40B ratio equals 32:8:30:30.

The accelerator employed was N-cyclohexyl-2-benzothiazole sulfenamide (CBS). Details of the formulations are given in Table 7.

TABLE 7

Rubber formulations incorporating aramid pellets

| | Experiment | | | | | |
|---|---|---|---|---|---|---|
| Ingredients | C | D | 11 | 12 | 13 | 14 |
| NR SVR 10 | 80 | 80 | 80 | 80 | 80 | 80 |
| Europrene BR 40 | 20 | 20 | 20 | 20 | 20 | 20 |
| Carbon Black N-326 | 55 | 53 | 53 | 53 | 53 | 53 |
| Zinc oxide | 5 | 5 | 5 | 5 | 5 | 5 |
| Stearic acid | 2 | 2 | 2 | 0 | 2 | 0 |
| Aromatic oil | 8 | 8 | 8 | 8 | 8 | 8 |
| Antidegradant 6PPD | 2 | 2 | 2 | 2 | 2 | 2 |
| Antioxidant TMQ | 1 | 1 | 1 | 1 | 1 | 1 |
| Accelerator CBS | 1.5 | 1.5 | 1.5 | 1.5 | 1.5 | 1.5 |
| sulfur | 1.5 | 1.5 | 1.5 | 1.5 | 1.5 | 1.5 |
| T11 | 0 | 0 | 1 | 0 | 0 | 0 |
| T11 | 0 | 0 | 0 | 2 | 0 | 0 |
| T11 | 0 | 0 | 0 | 0 | 3 | 0 |
| T11 | 0 | 0 | 0 | 0 | 0 | 5 |

NR is natural rubber; BR is polybutadiene; 6PPD is N-1,3-dimethylbutyl-N'-phenyl-p-phenylenediamine, TMQ is polymerized 2,2,4-trimethyl-1,2-dihydoquinoline antioxidant.

The vulcanized rubbers listed in Table 7 were tested according to ASTM/ISO norms. C and D are control experiments (rubber only) and 11 to 14 are experiments according to the invention. The results are given in Tables 8-12.

TABLE 8

Effect of the mixes at 100° C. on processing characteristics (Mooney viscosity).

| | Experiment | | | | | |
|---|---|---|---|---|---|---|
| | C | D | 11 | 12 | 13 | 14 |
| ML(1 + 4), MU | 39 | 39 | 38 | 42 | 38 | 45 |

The data of Table 8 show that the fiber particle according to the invention show low viscosity as evidenced from the ML (1+4) values.

TABLE 9

Effect of the mixes at 150° C. on delta torque.

| | Experiment | | | | | |
|---|---|---|---|---|---|---|
| | C | D | 11 | 12 | 13 | 14 |
| Delta S, Nm | 1.54 | 1.48 | 1.47 | 1.40 | 1.42 | 1.42 |

The data in Table 9 show that the fiber particles according to the invention do not show an effect on delta torque values.

TABLE 10

Evaluation of treated fibers for improvement in mechanical properties

| | Experiment | | | | | |
|---|---|---|---|---|---|---|
| | C | D | 11 | 12 | 13 | 14 |
| Modulus, 300%, MPa | 8.8 | 8.5 | 9.2 | 10.6 | 10.0 | 10.5 |
| Hardness (IRHD) | 62 | 62 | 61 | 61 | 61 | 62 |

It is clear from the data given in Table 10 that the peroxide containing fiber particle (mix 11 to 14) of the invention have similar modulus and hardness as the reference compounds.

TABLE 11

Evaluation of improvement in dynamic mechanical properties

| | Experiment | | | | | |
|---|---|---|---|---|---|---|
| | C | D | 11 | 12 | 13 | 14 |
| Loss modulus, MPa | 0.94 | 0.92 | 0.72 | 0.65 | 0.70 | 0.70 |
| Tangent delta | 0.162 | 0.164 | 0.136 | 0.123 | 0.128 | 0.129 |

It is noted that the fiber particles (mixes 11 to 14) show improved dynamic mechanical properties.

TABLE 12

Evaluation of treated fiber particle in Payne effect at 100° C.

| | Experiment | | | | | |
|---|---|---|---|---|---|---|
| | C | D | 11 | 12 | 13 | 14 |
| $\Delta(G'_{0.7}\text{-}G'_{20})$ (kPa) | 228 | 181 | 135 | 89 | 98 | 125 |
| $\Delta(G'_{0.7}\text{-}G'_{90})$ (kPa) | 272 | 225 | 180 | 140 | 144 | 181 |

It is noted that the peroxide containing fiber particles (mixes 11 to 14) show improved Payne effect indicating a better distribution of carbon black in the rubber.

Example 3

Aramid staple fiber pellets were prepared according to WO 0058064 and contained 80 wt % Twaron and 20 wt % polyethylene resin. The treatment of the pellets was done in the following way:

About 50 g of para-aramid pellets were mixed with molten wax containing a radical initiator in order to obtain an active oxygen concentration of about 1% unless indicated otherwise. Subsequently, pellets were cooled using dry-ice and a small excess of solidified wax, possibly containing small amounts of radical initiator, was removed by sieving. The p-aramid fiber pellets are summarized in Table 13.

TABLE 13

Aramid staple fiber pellets.

| Particle:polymer:wax:radical initiator:additive | wt %:wt %:wt %:wt %:wt % | Remark | Entry |
|---|---|---|---|
| Twaron:PE:St. St.:Trigonox 29-C75:Sunpar 2280 | 40.2:10.1:30.9:12.5:6.3 | invention | T12 |
| Twaron:PE:St. St.:dicumyl peroxide | 39.4:9.9:34.3:16.4:— | invention | T13 |
| Twaron:PE:St. St.:di(t-butylperoxy-isopropyl)benzene | 39.8:9.9:39.7:10.6:— | invention | T14 |
| Twaron:PE:St. St.:dilauroyl peroxide | 40.2:10:25.8:24:— | invention | T15 |
| Twaron:PE:St. St.:t-butylperoxy-3,5,5-tri-methylhexanoate | 40.2:10.1:35.6:14.1:— | invention | T16 |
| Twaron:PE:St. St.:t-butylperoxybenzoate | 40.1:10:38.1:11.8:— | invention | T17 |
| Twaron:PE:St. St.:cumyl hydroperoxide (88%) | 40:10:39.7:10.3:— | invention | T18 |
| Twaron:PE:St. St.:azobis(isobutyronitrile) (AIBN) | 41.3:10.3:36.3:12.1:— | invention | T19 |

PE = polyethylene; St. St. = stearyl stearate (Radia ® 7501 from Oleon NV); Uptake of AIBN in T19 was not complete.

The accelerator employed was N-cyclohexyl-2-benzothiazole sulfonamide (CBS). Details of the formulations are listed in Table 14.

TABLE 14

Rubber formulations incorporating aramid fiber particles

| Ingredients | E | F | 15 | 16 | 17 | 18 | 19 | 20 | 21 | 22 |
|---|---|---|---|---|---|---|---|---|---|---|
| NR SVR 10 | 80 | 80 | 80 | 80 | 80 | 80 | 80 | 80 | 80 | 80 |
| Europrene BR 40 | 20 | 20 | 20 | 20 | 20 | 20 | 20 | 20 | 20 | 20 |
| Black N-326 | 55 | 53 | 53 | 53 | 53 | 53 | 53 | 53 | 53 | 53 |
| Zinc oxide | 5 | 5 | 5 | 5 | 5 | 5 | 5 | 5 | 5 | 5 |
| Stearic acid | 2 | 2 | 2 | 2 | 2 | 2 | 2 | 2 | 2 | 2 |
| Aromatic oil | 8 | 8 | 8 | 8 | 8 | 8 | 8 | 8 | 8 | 8 |
| Antidegradant 6PPD | 2 | 2 | 2 | 2 | 2 | 2 | 2 | 2 | 2 | 2 |
| Antioxidant TMQ | 1 | 1 | 1 | 1 | 1 | 1 | 1 | 1 | 1 | 1 |
| Accelerator CBS | 1.5 | 1.5 | 1.5 | 1.5 | 1.5 | 1.5 | 1.5 | 1.5 | 1.5 | 1.5 |
| sulfur | 1.5 | 1.5 | 1.5 | 1.5 | 1.5 | 1.5 | 1.5 | 1.5 | 1.5 | 1.5 |
| T12 | 0 | 0 | 3 | 0 | 0 | 0 | 0 | 0 | 0 | 0 |
| T13 | 0 | 0 | 0 | 3 | 0 | 0 | 0 | 0 | 0 | 0 |
| T14 | 0 | 0 | 0 | 0 | 3 | 0 | 0 | 0 | 0 | 0 |
| T15 | 0 | 0 | 0 | 0 | 0 | 3 | 0 | 0 | 0 | 0 |
| T16 | 0 | 0 | 0 | 0 | 0 | 0 | 3 | 0 | 0 | 0 |
| T17 | 0 | 0 | 0 | 0 | 0 | 0 | 0 | 3 | 0 | 0 |
| T18 | 0 | 0 | 0 | 0 | 0 | 0 | 0 | 0 | 3 | 0 |
| T19 | 0 | 0 | 0 | 0 | 0 | 0 | 0 | 0 | 0 | 3 |

NR is natural rubber; BR is polybutadiene; 6PPD is N-1,3-dimethylbutyl-N'-phenyl-p-phenylenediamine; TMQ is polymerized 2,2,4-trimethyl-1,2-dihydroquinoline antioxidant; CBS is N-cyclohexyl benzothiazyl sulfenamide.

The vulcanized rubbers listed in Table 14 were tested according to ASTM/ISO norms. E and F are control experiments (rubber only), and 15 to 22 are experiments according to the invention. The results are given in Tables 1547.

TABLE 15

Effect of the mixes at 150° C. on delta torque.

| | E | F | 15 | 16 | 17 | 18 | 19 | 20 | 21 | 22 |
|---|---|---|---|---|---|---|---|---|---|---|
| Delta S, Nm | 1.52 | 1.44 | 1.47 | 1.48 | 1.5 | 1.51 | 1.49 | 1.53 | 1.52 | 1.5 |

The data in Table 15 show that the particles according to the invention (mix 15 to 22) do not influence the extent of crosslinking as demonstrated by delta S values.

TABLE 16

Evaluation of improvement in dynamic mechanical properties

| | E | F | 15 | 16 | 17 | 18 | 19 | 20 | 21 | 22 |
|---|---|---|---|---|---|---|---|---|---|---|
| Loss modulus, MPa | 1.11 | 1.0 | 0.87 | 0.83 | 0.90 | 1.02 | 0.89 | 0.97 | 0.85 | 0.98 |
| Tangent delta | 0.180 | 0.177 | 0.154 | 0.146 | 0.153 | 0.170 | 0.151 | 0.160 | 0.146 | 0.164 |

The data in Table 16 show that all particles, each containing a different radical initiator, give a decrease in tan delta. The effect is found both for peroxide type radical initiators (mix 15 to 21) and azo type radical initiator (mix 22). The decrease in tangent delta is most significant when alkoxy and/or hydroxy radicals are generated (mixes 15, 16, 17, 19, 21).

TABLE 17

Evaluation of treated fiber particle in Payne effect at 100° C.

| | Experiment | | | | | | | | | |
|---|---|---|---|---|---|---|---|---|---|---|
| | E | F | 15 | 16 | 17 | 18 | 19 | 20 | 21 | 22 |
| $\Delta(G'_{0.7}\text{-}G'_{20})$ (kPa) | 226 | 183 | 135 | 124 | 151 | 181 | 132 | 144 | 124 | 170 |
| $\Delta(G'_{0.7}\text{-}G'_{90})$ (kPa) | 271 | 226 | 177 | 168 | 196 | 225 | 175 | 186 | 164 | 215 |

It is noted that the radical containing fiber particles (mixes 15 to 22) show improved Payne effect indicating a better distribution of carbon black in the rubber.

Example 4

The same aramid fiber particle as described in Example 2 was used. The accelerator employed was N-cyclohexyl-2-benzothiazole sulfonamide (CBS). Details of the formulations are listed in Table 18. The formulations are representative of an off-the-road tire compound.

TABLE 18

Rubber formulations incorporating aramid pellets

| | Experiment | | |
|---|---|---|---|
| Ingredients | G | 23 | 24 |
| NR SVR 10 | 100 | 100 | 100 |
| Carbon Black N-220 | 40 | 40 | 40 |
| Zeosil 1165 | 20 | 20 | 20 |
| Si-69 | 1.5 | 1.5 | 1.5 |
| Aromatic oil | 3 | 3 | 3 |
| Zinc oxide | 5 | 5 | 5 |
| stearic acid | 2 | 2 | 2 |
| In.-Cum.harz B/85 | 3 | 3 | 3 |
| Sunolite 240 | 1 | 0.7 | 0.4 |
| DPG | 1 | 1 | 1 |
| Accelerator CBS | 1.5 | 1.5 | 1.5 |
| sulfur | 1.5 | 1.5 | 1.5 |
| T11 | 0 | 0 | 0 |
| T11 | 0 | 1 | 0 |
| T11 | 0 | 0 | 2 |

NR is natural rubber; Zeosil 1165 is high surface silica; Si-69 is bis(3-triethoxysilylpropyl) tetrasulfide; In.-Cum.harz B/85 is a coumarone-indene resin; Sunolite 240 is a microcrystalline wax, DPG is diphenylguanidine.

The vulcanized rubbers listed in Table 18 were tested according to ASTM/ISO norms. G is a control experiment (rubber only) and 23 and 24 are experiments according to the invention. The results are given in Tables 19 to 23.

TABLE 19

Effect of the mixes at 100° C. on processing characteristics (Mooney viscosity).

| | Experiment | | |
|---|---|---|---|
| | G | 23 | 24 |
| ML(1 + 4), MU | 53 | 51 | 48 |

The data of Table 19 show that the staple fiber particle according to the invention show low viscosity as evidenced from the ML (1+4) values.

TABLE 20

Effect of the mixes at 150° C. on delta torque.

| | Experiment | | |
|---|---|---|---|
| | G | 23 | 24 |
| Delta S, Nm | 1.94 | 1.94 | 1.92 |

The data in Table 20 show that the fiber particle according to the invention does not show an effect on delta torque values.

TABLE 21

Evaluation of treated fibers for improvement in mechanical properties

| | Experiment | | |
|---|---|---|---|
| | G | 23 | 24 |
| Modulus, 300%, MPa | 14.4 | 15.5 | 15 |
| Hardness (IRHD) | 73 | 72 | 72 |

It is clear from the data depicted in Table 21 that the peroxide containing fiber particles (mix 23 and 24) of the invention have similar modulus and hardness as the reference compound.

TABLE 22

Evaluation of improvement in dynamic mechanical properties

| | Experiment | | |
|---|---|---|---|
| | G | 23 | 24 |
| Heat build-up, ° C. | 28.6 | 28.1 | 27.6 |
| Loss modulus, MPa | 1.467 | 1.334 | 1.279 |
| Tangent delta | 0.163 | 0.152 | 0.149 |

It is noted that the peroxide containing fiber particles (mixes 23 and 24) show improved dynamic mechanical properties, especially about 8% decrease in tangent delta.

TABLE 23

Evaluation of treated fiber particle in Payne effect at 100° C.

| | Experiment | | |
|---|---|---|---|
| | G | 23 | 24 |
| $\Delta(G'_{0.7}\text{-}G'_{20})$ (kPa) | 269 | 226 | 215 |
| $\Delta(G'_{0.7}\text{-}G'_{90})$ (kPa) | 324 | 280 | 267 |

It is noted that the peroxide containing fiber particles (mixes 23 and 24) show improved Payne effect indicating a better distribution of carbon black in the rubber.

Example 5

The same particle was applied as in Example 2.
Details of the formulations of this example are given in Table 24.

TABLE 24

|  | Experiment | |
|---|---|---|
| Ingredients | H | 25 |
| Keltan ® 578 | 100 | 100 |
| FEF - N550 | 60 | 60 |
| SRF - N765 | 40 | 40 |
| Sunpar ® 2280 | 50 | 50 |
| Rhenogran ® ZMMBI-50 | 1.5 | 1.5 |
| Naugard ® 445 | 1.5 | 1.5 |
| sulfur | 0.3 | 0.3 |
| Perkadox ®14-40 Kpd | 9 | 9 |
| T11 | 0 | 2 |

Keltan ® 578 is an EPDM compound; Sunpar ®2280 is a paraffin processing oil; Rhenogran ® ZMMBI-50 is 50 wt % polymer bound methyl-2-mercaptobenzimidazol; Naugard ® 445 is 4,4'-bis(α,α-dimethylbenzyl)diphenylamine; Perkadox ® 14-40 K-pd is 40 wt % di(tert-butylperoxyisopropyl)benzene on clay.

The vulcanized rubbers listed in Table 24 were tested according to ASTM/ISO norms. A is a control experiment (rubber only), and 1 is an experiment according to the invention. The results are given in Tables 25 to 27.

TABLE 25

Effect of the mixes at 100° C. on processing characteristics (Mooney viscosity).

|  | Experiment | |
|---|---|---|
|  | H | 25 |
| ML(1 + 4), MU | 58.9 | 64.1 |

The data of Table 25 show that the staple fiber particle according to the invention show low viscosity as evidenced from the ML (1+4) values.

TABLE 26

Effect of the mixes at 150° C. on delta torque.

|  | Experiment | |
|---|---|---|
|  | H | 25 |
| Δ(G'$_{0.3}$-G'$_{20}$) (kPa) | 229 | 177 |
| Δ(G'$_{0.3}$-G'$_{90}$) (kPa) | 278 | 236 |

It is noted that the peroxide containing fiber particle (mix 25) shows improved Payne effect indicating a better distribution of carbon black in the EPDM.

TABLE 27

Evaluation of improvement in dynamic mechanical properties

|  | Experiment | |
|---|---|---|
|  | H | 25 |
| Loss modulus, MPa | 1.164 | 1.056 |
| Tangent delta | 0.174 | 0.153 |

It is noted that the peroxide containing fiber particle (mix 25) show improved dynamic mechanical properties, especially a 12% decrease in tangent delta.

Example 6

Staple fiber pellets were prepared according to WO 00/58064 and contained 80 wt % of fiber as indicated in Table 28 and 20 wt % polyethylene resin, The treatment of the pellets was done in the following way:

About 50 g of para-aramid pellets were mixed with molten wax containing a radical initiator in order to obtain an active oxygen concentration of about 1% unless indicated otherwise. Subsequently, pellets were cooled using dry-ice and a small excess of solidified wax, possibly containing small amounts of radical initiator, was removed by sieving. The p-aramid fiber pellets are summarized in Table 28. In addition, Silenka 3 mm short cut glass fiber was treated with wax and peroxide in a similar fashion.

TABLE 28

Fiber-matrix-radical initiator particles.

| Particle:polymer:wax radical initiator:additive | wt %:wt %:wt %:wt % | Remark | Entry |
|---|---|---|---|
| Polyester:PE:St. St.:Trigonox29-C75 | 39.7:9.9:37.7:12.8 | invention | T20 |
| Polyester:PE:St. St. | 39.3:9.9:50.8 | comparison | T21 |
| Nylon:PE:St. St.:Trigonox29-C75 | 38.8:9.7:38.5:13.0 | invention | T22 |
| Nylon:PE:St. St. | 38.5:9.6:51.9 | comparison | T23 |
| Lyocell:PE:St. St.:Trigonox29-C75 | 39.4:9.9:37.9:12.8 | invention | T24 |
| Lyocell:PE:St. St. | 39.0:9.7:51.3 | comparison | T25 |
| Silenka:St. St.:Trigonox29-C75 | 34.6:48.9:16.5 | invention | T26 |
| Silenka:St. St. | 34.3:65.7 | comparison | T27 |
| Twaron:PE:St. St.:Trigonox29-C75 | 39.3:9.9:38.0:12.8 | invention | T28 |
| Twaron:PE:St. St. | 42.9:10.7:46.4 | comparison | T29 |

PE = polyethylene; St. St. = stearyl stearate (Radia ® 7501 from Oleon NV); Lyocell is cellulose yarn; Silenka = Silenka 3 mm PPG ECG Tex Z20.

The accelerator employed was N-cyclohexyl-2-benzothiazole sulfenamide (CBS). Details of the formulations are listed in Table 29.

TABLE 29

Rubber formulations incorporating aramid fiber particles

|  | Experiment | | | | | | | | | | | |
|---|---|---|---|---|---|---|---|---|---|---|---|---|
| Ingredients | J | K | 26 | 27 | 28 | 29 | 30 | 31 | 32 | 33 | 34 | 35 |
| NR SVR 10 | 80 | 80 | 80 | 80 | 80 | 80 | 80 | 80 | 80 | 80 | 80 | 80 |
| Europrene BR 40 | 20 | 20 | 20 | 20 | 20 | 20 | 20 | 20 | 20 | 20 | 20 | 20 |
| Black N-326 | 55 | 53 | 53 | 53 | 53 | 53 | 53 | 53 | 53 | 53 | 53 | 53 |
| Zinc oxide | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 |
| Aromatic oil | 8 | 8 | 8 | 8 | 8 | 8 | 8 | 8 | 8 | 8 | 8 | 8 |
| Antidegradant 6PPD | 2 | 2 | 2 | 2 | 2 | 2 | 2 | 2 | 2 | 2 | 2 | 2 |

TABLE 29-continued

Rubber formulations incorporating aramid fiber particles

| Ingredients | J | K | 26 | 27 | 28 | 29 | 30 | 31 | 32 | 33 | 34 | 35 |
|---|---|---|---|---|---|---|---|---|---|---|---|---|
| Antioxidant TMQ | 1 | 1 | 1 | 1 | 1 | 1 | 1 | 1 | 1 | 1 | 1 | 1 |
| Sunolite 240 | 2 | 2 | 1.1 | 1.1 | 1.1 | 1.1 | 1.1 | 1.1 | 1.1 | 1.1 | 1.1 | 1.1 |
| Accelerator CBS | 1.5 | 1.5 | 1.5 | 1.5 | 1.5 | 1.5 | 1.5 | 1.5 | 1.5 | 1.5 | 1.5 | 1.5 |
| sulfur | 1.5 | 1.5 | 1.5 | 1.5 | 1.5 | 1.5 | 1.5 | 1.5 | 1.5 | 1.5 | 1.5 | 1.5 |
| T20 | 0 | 0 | 3 | 0 | 0 | 0 | 0 | 0 | 0 | 0 | 0 | 0 |
| T21 | 0 | 0 | 0 | 3 | 0 | 0 | 0 | 0 | 0 | 0 | 0 | 0 |
| T22 | 0 | 0 | 0 | 0 | 3 | 0 | 0 | 0 | 0 | 0 | 0 | 0 |
| T23 | 0 | 0 | 0 | 0 | 0 | 3 | 0 | 0 | 0 | 0 | 0 | 0 |
| T24 | 0 | 0 | 0 | 0 | 0 | 0 | 3 | 0 | 0 | 0 | 0 | 0 |
| T25 | 0 | 0 | 0 | 0 | 0 | 0 | 0 | 3 | 0 | 0 | 0 | 0 |
| T26 | 0 | 0 | 0 | 0 | 0 | 0 | 0 | 0 | 3 | 0 | 0 | 0 |
| T27 | 0 | 0 | 0 | 0 | 0 | 0 | 0 | 0 | 0 | 3 | 0 | 0 |
| T28 | 0 | 0 | 0 | 0 | 0 | 0 | 0 | 0 | 0 | 0 | 3 | 0 |
| T29 | 0 | 0 | 0 | 0 | 0 | 0 | 0 | 0 | 0 | 0 | 0 | 3 |

NR is natural rubber; BR is polybutadiene; 6PPD is N-1,3-dimethylbutyl-N'-phenyl-p-phenylenediamine; TMQ is polymerized 2,2,4-trimethyl-1,2-dihydroquinoline antioxidant; CBS is N-cyclohexyl benzothiazyl sulfenamide.

The vulcanized rubbers listed in Table 29 were tested according to ASTM/ISO norms. J and K are control experiments (rubber only), 27, 29, 31, 33, and 35 are comparison experiments (fiber with matrix and/or wax without peroxide) and 26, 28, 30, 32, and 34 are experiments according to the invention. The results are given in Tables 30-32.

TABLE 30

Effect of the mixes at 150° C. on delta torque.

| | J | K | 26 | 27 | 28 | 29 | 30 | 31 | 32 | 33 | 34 | 35 |
|---|---|---|---|---|---|---|---|---|---|---|---|---|
| Delta S, Nm | 1.59 | 1.53 | 1.46 | 1.51 | 1.45 | 1.54 | 1.46 | 1.55 | 1.42 | 1.52 | 1.49 | 1.58 |

The data in Table 30 show that the particles according to the invention (mix 26, 28, 30, 32 and 34) do not influence the extent of crosslinking as demonstrated by delta S values.

TABLE 31

Evaluation of improvement in dynamic mechanical properties

| | J | K | 26 | 27 | 28 | 29 | 30 | 31 | 32 | 33 | 34 | 35 |
|---|---|---|---|---|---|---|---|---|---|---|---|---|
| Loss modulus, MPa | 0.96 | 0.79 | 0.58 | 0.80 | 0.55 | 0.86 | 0.58 | 0.88 | 0.55 | 0.89 | 0.54 | 0.88 |
| Tangent delta | 0.155 | 0.137 | 0.102 | 0.134 | 0.117 | 0.147 | 0.108 | 0.148 | 0.106 | 0.154 | 0.102 | 0.151 |

The data in Table 31 show that all fiber-matrix-Trigonox 29 particles, each containing a different fiber, give a decrease in tan delta (mix 26, 28, 30, 32 and 34), whereas tangent delta is at the same level of the control experiments for the fiber-matrix particles that do not contain Trigonox 29.

TABLE 32

Evaluation of treated fiber particle in Payne effect at 100° C.

| | J | K | 26 | 27 | 28 | 29 | 30 | 31 | 32 | 33 | 34 | 35 |
|---|---|---|---|---|---|---|---|---|---|---|---|---|
| $\Delta(G'_{0.7}-G'_{20})$ (kPa) | 180 | 146 | 86 | 151 | 74 | 172 | 68 | 154 | 52 | 145 | 84 | 159 |
| $\Delta(G'_{0.7}-G'_{90})$ (kPa) | 222 | 193 | 134 | 200 | 121 | 221 | 108 | 194 | 90 | 184 | 128 | 200 |

It is noted that the all fiber-matrix-radical initiator particles (mix 26, 28, 30, 32 and 34) show improved Payne effect indicating a better distribution of carbon black in the rubber irrespective of the fiber type, whereas the Payne effect is at the same level of the control experiments for the fiber-matrix particles that do not contain a radical initiator.

Example 7

Staple fiber pellets Were prepared according to WO 00/58064 and contained 80 wt % of Twaron and 20 wt % of resin as indicated in Table 33. The treatment of the pellets was done in the following way:

About 50 g of para-aramid pellets were mixed with molten wax containing a radical initiator in order to obtain an active oxygen concentration of about 1% unless indicated otherwise. Subsequently, pellets were cooled using dry-ice and a small excess of solidified wax, possibly containing small amounts of radical initiator, was removed by sieving. The p-aramid fiber pellet particles are summarized in Table 33. In addition Twaron pulp was treated with wax and peroxide in a similar fashion.

TABLE 33

Fiber-matrix-radical initiator particles.

| Particle:polymer:wax: radical initiator | wt %:wt %:wt %:wt % | Remark | Entry |
|---|---|---|---|
| Tw pulp:—:St. St.: Trigonox 29-C75 | 34.4:—:49.9:15.7 | invention | T30 |
| Twaron:PA:St. St.: Trigonox 29-40B | 35.2:8.8:28.0:28.0 | invention | T31 |
| Twaron:PP:St. St.: Trigonox 29-40B | 37.0:9.3:26.9:26.8 | invention | T32 |

Tw pulp = Twaron 1093 pulp; PA = polyamide; PP = polypropylene; St. St. = stearyl stearate (Radia ® 7501 from Oleon NV).

The accelerator employed was N-cyclohexyl-2-benzothiazole sulfenamide (CBS). Details of the formulations are listed in Table 34.

TABLE 34

Rubber formulations incorporating aramid fiber particles

| Ingredients | Experiment | | | | |
|---|---|---|---|---|---|
| | L | M | 36 | 37 | 38 |
| NR SVR 10 | 80 | 80 | 80 | 80 | 80 |
| Europrene BR 40 | 20 | 20 | 20 | 20 | 20 |
| Black N-326 | 55 | 53 | 53 | 53 | 53 |
| Zinc oxide | 5 | 5 | 5 | 5 | 5 |
| Stearic acid | 2 | 2 | 2 | 2 | 2 |
| Aromatic oil | 8 | 8 | 8 | 8 | 8 |
| Antidegradant 6PPD | 2 | 2 | 2 | 2 | 2 |
| Antioxidant TMQ | 1 | 1 | 1 | 1 | 1 |
| Sunolite 240 | 2 | 2 | 1.1 | 1.1 | 1.1 |
| Accelerator CBS | 1.5 | 1.5 | 1.5 | 1.5 | 1.5 |
| sulfur | 1.5 | 1.5 | 1.5 | 1.5 | 1.5 |
| T30 | 0 | 0 | 3 | 0 | 0 |
| T31 | 0 | 0 | 0 | 3 | 0 |
| T32 | 0 | 0 | 0 | 0 | 3 |

NR is natural rubber; BR is polybutadiene; 6PPD is N-1,3-dimethylbutyl-N'-phenyl-p-phenylenediamine, TMQ is polymerized 2,2,4-trimethyl-1,2-dihydroquinoline antioxidant, Sunolite 240 is a microcrystalline wax, CBS is N-cyclohexyl benzothiazyl sulfenamide.

The vulcanized rubbers listed in Table 34 were tested according to ASTM/ISO norms. L and M are control experiments (rubber only), and 36 to 38 are experiments according to the invention. The results are given in Tables 36-37.

TABLE 35

Effect of the mixes at 150° C. on delta torque.

| | Experiment | | | | |
|---|---|---|---|---|---|
| | L | M | 36 | 37 | 38 |
| Delta S, Nm | 1.52 | 1.51 | 1.43 | 1.45 | 1.46 |

The data in Table 35 show that the particles according to the invention (mix 36 to 38) do not influence the extent of crosslinking as demonstrated by delta S values,

TABLE 36

Evaluation of improvement in dynamic mechanical properties

| | Experiment | | | | |
|---|---|---|---|---|---|
| | L | M | 36 | 37 | 38 |
| Loss modulus, MPa | 0.89 | 0.82 | 0.47 | 0.52 | 0.49 |
| Tangent delta | 0.148 | 0.143 | 0.093 | 0.099 | 0.096 |

The data in Table 36 show that most particle-matrix-Trigonox 29 compositions, comprising different particles, both chemically and physically, and different matrices, give a decrease in tan delta (mixes 36 to 38).

TABLE 37

Evaluation of treated fiber particle in Payne effect at 100° C.

| | Experiment | | | | |
|---|---|---|---|---|---|
| | L | M | 36 | 37 | 38 |
| $\Delta(G'_{0.7}-G'_{20})$ (kPa) | 159 | 138 | 64 | 65 | 60 |
| $\Delta(G'_{0.7}-G'_{90})$ (kPa) | 205 | 183 | 107 | 106 | 103 |

It is noted that the all particle-matrix-radical initiator particles (mix 36 to 38) show improved Payne effect indicating a better distribution of carbon black in the rubber irrespective of the particle type, and matrix.

The invention claimed is:

1. An aramid or cellulose fiber or fibrid at least partially coated with composition containing a matrix and a peroxide or azo radical initiator, wherein
the matrix is selected from a polyolefin, a wax, and a mixture thereof.

2. The aramid or cellulose fiber or fibrid of claim 1 wherein the radical initiator is a peroxide.

3. The aramid or cellulose fiber or fibrid of claim 2 wherein the radical initiator is a dialkyl peroxyketal, a dialkyl peroxide, a di(alkylperoxy)alkylene, a di(alkylperoxy)aralkylene, or a mixture thereof.

4. The aramid or cellulose fiber or fibrid of claim 3 wherein the radical initiator is 1,1-(tert-butylperoxy)- cyclohexane and/or 1,1-(tert-butylperoxy)-3,3,5-trimethylcyclohexane.

5. The aramid or cellulose fiber or fibrid of claim 1 wherein the composition comprises 5-98 wt % of the radical initiator, based on the weight of the composition.

6. The aramid or cellulose fiber or fibrid of claim 1 wherein the matrix is selected from an extrudable polymer, a wax, and a mixture thereof.

7. The aramid or cellulose fiber or fibrid of claim 6 wherein the extrudable polymer is a polyolefin selected from polyethylene and/or a derivative thereof, polypropylene and/or a derivative thereof, and a mixture thereof.

8. The aramid or cellulose fiber or fibrid of claim 6 wherein the wax is a saturated alkanecarboxylic acid ester having 12-50 carbon atoms, or a synthetic microcrystalline wax having a C22-C38 alkyl chain.

9. The aramid or cellulose fiber or fibrid of claim 8 comprising up to 85 wt % based on the weight of the particle at least one of stearyl stearate and palmityl stearate.

10. The aramid or cellulose fiber or fibrid of claim 1 wherein the fiber or fibrid is a poly(p-phenylene-terephthalamide) or a co-poly-(paraphenylene/3,4'-oxydiphenylene terephthalamide) fiber.

11. The aramid or cellulose fiber or fibrid of claim 1 wherein the fiber or fibrid is a continuous fiber, chopped fiber, staple fiber or pulp, optionally which is pre-treated with a sizing.

12. The aramid or cellulose fiber or fibrid of claim 1 wherein the composition amounts 5-90 wt %, based on the weight of the fiber or fibrid.

* * * * *